United States Patent [19]

Zock

[11] Patent Number: 5,080,915
[45] Date of Patent: Jan. 14, 1992

[54] METHOD FOR PREPARING PUFF PASTRY AND PUFF PASTRY PRODUCTS

[75] Inventor: Hendrik F. Zock, Barendrecht, Netherlands

[73] Assignee: Conopco, Inc., N.J.

[21] Appl. No.: 355,078

[22] Filed: May 17, 1989

Related U.S. Application Data

[63] Continuation of Ser. No. 63,152, Jun. 17, 1986, abandoned.

[30] Foreign Application Priority Data

Jun. 19, 1987 [NL] Netherlands ................. 8601594

[51] Int. Cl.$^5$ .......................... A21D 8/00; A23D 7/00
[52] U.S. Cl. ........................................ 426/94; 426/99; 426/556; 426/603
[58] Field of Search .............. 426/99, 94, 556, 559, 426/602, 603

[56] References Cited

U.S. PATENT DOCUMENTS

| | | | |
|---|---|---|---|
| 1,403,122 | 1/1922 | Lawson | 426/603 |
| 2,147,751 | 2/1939 | Northcutt | 426/617 |
| 2,290,854 | 7/1942 | Hoy | 426/92 |
| 3,151,987 | 10/1964 | Colby | 426/556 |
| 3,556,798 | 1/1971 | Tucker et al. | 426/556 |
| 3,615,682 | 10/1971 | La Baw et al. | 426/556 |
| 4,259,359 | 3/1981 | Spicer | 426/559 X |
| 4,294,862 | 10/1981 | Wilke | 426/502 |
| 4,622,226 | 11/1986 | Ke et al. | 426/556 |
| 4,647,467 | 3/1987 | Pinto | 426/556 |

FOREIGN PATENT DOCUMENTS

| | | |
|---|---|---|
| 898217 | 5/1984 | Belgium . |
| 0153062 | 12/1981 | German Democratic Rep. . |
| 6406701 | 12/1964 | Netherlands . |
| 7806009 | 12/1978 | Netherlands . |
| 2070408 | 9/1981 | United Kingdom ................ 426/556 |

OTHER PUBLICATIONS

FMBRA Bulletin 1985, No. 6 Dec., pp. 234–245 and 252.
FMBRA Bulletin 1986, No. 5 Oct., pp. 222–235.

*Primary Examiner*—Donald E. Czaja
*Assistant Examiner*—Mary S. Mims
*Attorney, Agent, or Firm*—Brumbaugh, Graves, Donohue & Raymond

[57] ABSTRACT

Method for preparing puff pastry in which puff pastry is formed using flour while adding water and a fat composition, in which the fat composition comprises fat and vegetable fibre material in a weight ratio between 1:1 and 20:1. The vegetable fibre material preferably comprises wheat bran.

Fat composition, characterized in that it comprises fat or a mixture of fats and a vegetable fibre material in a weight ratio between 1:1 and 20:1, the vegetable fibre material comprising bran.

10 Claims, No Drawings

METHOD FOR PREPARING PUFF PASTRY AND PUFF PASTRY PRODUCTS

This application is a continutation of application Ser. No. 063,152, filed on June 17, 1987.

BACKGROUND OF THE INVENTION

The invention relates to a method for puff pastry in which puff pastry is formed using flour to which water and a fat composition are added.

In this application by flour is understood the meal fraction from which bran has been removed; by bran is understood: bran and/or germs and/or other cereal fractions which are left behind on the sieve when sieving cleaned and subsequently ground cereal grains.

In this application by a fat composition is understood: one or more fats which have possibly been admixed with water and other additives. Such fat compositions often comprise a water-and-fat emulsion. The use of such fat compositions in preparing puff pastry makes it desirable for them to be rather hard, plastically deformable and firm over a broad temperature range.

By vegetable fibre materials are understood: vegetable fibre materials which have not been modified or have been modified such that, nevertheless, the structure of the fibre has remained mainly intact.

A method that is often used for preparing puff pastry is the so-called French method. In this method a dough is obtained from flour, water plus optionally fat and other additives by kneading After adding a fat composition, puff pastry can be obtained from this dough. For this purpose the dough is rolled out, whereafter a fat layer is applied to the dough and the whole is folded. By rolling and folding repeatedly, puff pastry is obtained.

A second method for preparing puff pastry, which is called the Dutch method, is concerned with the addition of a fat composition in the form of small cubes, directly to the flour, whereafter a dough is kneaded while adding water and possibly additives. Puff pastry is obtained therefrom by repeatedly rolling out and folding.

Puff pastry obtained according to the above described methods can, after preparation, be stored well in the deep-freeze. When using the dough, optionally after rolling it out, all kinds of layered products like pies, almond-filled pastries, snacks etc. can be obtained therefrom by baking.

The above-mentioned methods are only applicable when using flour. However, besides flour, ground cereal also contains bran. Using flour containing this bran in the preparation of puff pastry detrimentally affects the rising of the puff pastry obtained therefrom. The puff pastry products obtained therefrom are mostly badly risen and have an unattractive appearance. The aerated structure, which is characteristic of puff pastry products, is substantially entirely absent. Also the use of flour, to which vegetable fibre material has been added, in preparing puff pastry appears to result in similar, substantially unrisen products.

The invention aims at providing a method for preparing puff pastry which contains vegetable fibre material, from which nevertheless a risen product can be obtained.

SUMMARY OF THE INVENTION

Accordingly, the present invention is concerned with a method for preparing puff pastry in which puff pastry is formed using flour to which water and a fat composition are added in which a fat composition is used comprising fat and vegetable fibre material in a weight ratio between 1:1 and 20:1.

It has been found that by incorporating the fibre material in the fat composition not only a well risen product is obtained, but also that by using a fibre material, of which the structure is mainly two-dimensional (sheet form), the layer-forming action of the fat is reinforced, as a result of which an increased separation of the dough layers is obtained in the baking process. Moreover, there is a suspicion that owing to the absence of vegetable fibre material in the starting dough of flour and water plus any additives, the gluten structure of this dough can develop well.

DESCRIPTION OF THE PREFERRED EMBODIMENTS

Preferably, vegetable fibre material is used of which the structure is in sheet form. Vegetable fibre materials coming from the seeds of the gramineae, such as cereals, maize etc. are particularly suitable. The use of bran as vegetable fibre material is particularly preferred.

As puff pastry is generally prepared using wheat flour, the use of wheat bran offers the possibility to incorporate in the puff pastry all ingredients of a wholemeal puff pastry.

To this end, the amount of wheat bran in the fat composition is chosen such that the weight ratio wheat bran:flour in the puff pastry is equal to the weight ratio wheat bran:flour in the wholemeal wheat flour.

For good results to be obtained, bran having an average particle size of for instance 0.3 to 6 mm can be used. The use of bran having an average particle size of 0.5 to 3 mm is particularly preferred.

Preferably, a flour is used having a protein content of at least 12% by weight, more preferably at least 14% by weight, calculated on the dry matter. Flour of this kind is referred to as rich in gluten. If flour of a protein content lower than 12% by weight is used, it is preferred to add extra protein to the puff pastry, e.g. in the form of so-called vital gluten.

Preferably, 10 to 500 mg ascorbic acid per kg flour is incorporated in the puff pastry. The presence of ascorbic acid in these amounts in puff pastry, which does not contain vegetable fibre material, is generally not desirable. The ascorbic acid in such puff pastry causes a so-called "turn-over effect": this effect is characterized by strong rising combined with shifting of the puff pastry layers with respect to each other, as a result of which a crooked or even collapsed product is obtained. The presence of 10 to 500 mg/kg ascorbic acid (preferably L-ascorbic acid is used) in the puff pastry containing vegetable fibre material appears not to bring about, or only barely, this adverse "turn-over" effect. On the contrary, the presence of the ascorbic acid generally results in a better risen, stable puff pastry product.

An advantageous embodiment of a method according to the invention concerns admixing ascorbic acid with the starting dough of sieved meal and water plus any additives. In this case the optimum amount of ascorbic acid is 25-100 mg ascorbic acid per kg flour. Larger amounts of ascorbic acid in the starting dough can result in a so-called shrinking effect, which is characterized by contracting of the gluten structure in a horizontal direction. On the other hand, the addition of ascorbic acid to the fat requires a considerably larger amount of ascorbic acid to obtain a similar, well risen, stable puff pastry product.

On calculating the amount of ascorbic acid to be added, it should, however, be taken into account that some flours and vegetable fibre materials already contain ascorbic acid.

Also oxidizing agents like e.g. potassium bromate can be used jointly with, or instead of, ascorbic acid. The amounts of these oxidizing agents to be used are also decided by regulations of the Food and Drugs Act. Also other salts such as NaCl and calcium phosphate give an improved product.

It has also been found that, to avoid sandiness and crumblyness and to improve crustiness and crispness, a certain amount (e.g. up to about 10% by weight) of a protein preferably containing casein (e.g. sodium caseinate) can be advantageously incorporated in the starting dough.

The invention also relates to a fat composition to be used in the method according to the invention. Fat compositions that can be used in the preparation of puff pastry comprise one or more fats as well as possibly water and possibly additives. Such fat compositions often comprise a water-and-fat emulsion. Their use in the preparation of puff pastry makes it desirable for such fat compositions to be fairly hard, plastically deformable and firm over a relatively broad temperature range (e.g. 15°–25° C.).

When using a method according to the invention, fat compositions of a special compositions are used. Such a fat composition comprises fat and vegetable fibre material in a weight ratio between 1:1 and 20:1.

A fat composition according to the invention should preferably contain 50–80% fat. The solids content of the fat (SFI) in the temperature range of 15°–25°C. should preferably be between 20 and 60%.

Vegetable fibre materials that can be used are e.g usual fibre materials such as e.g. fruit pulp, tomato pulp as well as hemicellulose. The fibre materials used should preferably not contain or absorb too much water. The effect of fibre materials containing ascorbic acid has already been pointed out.

The vegetable fibre material preferably contains bran, particularly wheat bran. The amount of bran is about 15–40% by weight of the fat composition.

Using wheat bran makes it possible to add to the puff pastry bran originating from the same kind of cereal as wheat flour, which enables incorporation of all the ingredients of a wholemeal puff pastry in the puff pastry. Preferably, bran having an average particle size of 0.3 to 6 mm is used. The use of bran having a particle size of 0.5 to 3 mm is particularly preferred.

Ascorbic acid is one of the additives that can be added to the fat compositions. Preferably, the fat composition contains 300–1500 mg/kg ascorbic acid. This ascorbic acid can be derived partly or completely from the vegetable fibre materials that have been incorporated in the fat composition. Other additives such as salt and flavours can be incorporated as desired.

The above described fat compositions have the advantage that puff pastry containing vegetable fibre material can be simply obtained therefrom and can be processed into attractive puff pastry products.

Puff pastry containing vegetable fibre material according to the invention will, in practice, preferably be composed of 30–50 parts by weight of flour, 15–25 parts by weight of water, 2–20 parts by weight of vegetable fibre material, preferably wheat bran, and comprise 10–50 parts by weight of fat. By water is understood here: added water, i.e, water that is added as such or as component of the fat composition.

In the puff pastry according to the invention the vegetable fibre material will have been mainly incorporated in the fat layers, that is to say that more than half of the particles of vegetable fibre material are present in a fat layer or at the interface of a fat layer and a dough layer. When fibre material having a sheet form, such as bran, is used, the fibre particles will be oriented mainly parallel to the layer structure formed.

Preferably, the puff pastry comprises 10–500 mg ascrobic acid per kg of flour. The protein content of the flour used is preferably at least 12% by weight, more in particular at least 14% weight, calculated on the dry matter.

The invention will be illustrated in the following, non-restrictive Examples in which the amount of ascorbic acid is indicated in mg per kg of flour.

EXAMPLE I

A dough (1) was obtained by mixing 1000 g of a strong American patent flour (14.5% protein on dry matter), 520 g water, 100 g fat and 50 mg ascorbic acid, whereafter, by rolling out and folding, while adding 800 g of a fat composition in the form of margarine (80% fat, 20% water), which has been admixed with 150 g wheat bran, puff pastry having about 120 layers was formed from the starting dough. The fat composition comprises a fat blend having as SFI of 50% at 15° C. and an SFI of 30% at 25° C. The bran has an average particle size of 1.1 mm.

For comparison, a dough (2) was prepared by mixing 1000 g of the same strong American patent flour, 520 g water, 100 g fat, 150 g wheat bran and 50 mg ascorbic acid, whereafter, by rolling out and folding, while adding 800 g of a fat composition, puff pastry having about 120 layers was formed from the starting dough. The fat composition comprises a fat blend having an SPI of 50% at 15° C. and an SFI of 30% at 25° C. The bran has an average particle size of 0.5 mm.

Both puff pastries were rolled out to 3.75 mm thickness. A pie of 7.8 cm diameter of dough of both kinds is formed by combining a bottom layer with an edge layer and baking it for 20 minutes at 220°–° C.

From puff pastry (2) a product is formed having the moderate edge height of 36 mm and a moderate to bad structure. From puff pastry (1) a product is formed having an edge height of 47 mm and a good structure. In both products no undesirable shrinking occurs.

Adding wheat bran which has been worked into the fat composition therefore results in considerably better puff pastry.

EXAMPLE II

Puff pastry (3) was obtained by mixing 1000 g of strong American patent flour (14.5% by weight on dry matter), 520 g water, 100 g fat and 50 g ascorbic acid, followed by rolling out and double folding the dough while adding 800 g of a fat composition in the form of margarine (80% fat 20% water) which has been admixed with 150 g bran.

Puff pastry (4) was obtained by mixing 1000 g of strong American patent flour (14.5% by weight on dry matter), 520 g water and 100 g fat and 50 mg ascorbic acid, followed by rolling out and folding the dough while adding 800 g of a fat composition in the form of a margarine, which has been admixed with 150 g bran and 400 mg ascorbic acid. The fat composition comprises a fat blend having an SFI of 50% at 150° C. and an SFI of 30% at 25° C. The bran has an average particle size of 1.9 mm.

Both puff pastries are rolled out and folded to puff pastry having about 120 layers and 3.75 mm thickness. From both kinds a pie is formed (as in Example I) by combining a bottom layer and an edge layer of the dough, which pies are baked for 20 minutes at 220°–230° C.

From puff pastry (3) a product is formed having an edge height of 50 mm and a good structure. From puff pastry (4) a product is formed having an edge height of 43 mm and a comparable, good structure.

From this it follows that adding ascorbic acid to puff pastry requires a larger amount of ascorbic acid to obtain a comparable rising effect than when ascorbic acid is added to the starting dough.

EXAMPLE III

Three puff pastries were prepared by mixing 1000 g of strong American patent flour (protein content 14.5% by weight on dry matter), 520 g water, 100 g fat and 0 mg, 25 mg and 50 mg ascorbic acid, respectively, followed by rolling out the dough while adding 600 g of a fat composition containing no water, which has been admixed with 150 g wheat bran. The fat composition comprises a fat blend having an SFI of 50% at 15° C. and an SFI of 30% at 25° C. The bran has an average particle size of 3.0 mm.

The puff pastries are folded and rolled out to puff pastry having about 120 layers and 3.75 mm thickness. The doughs are formed into pies (as in Example I) by combining a bottom layer and an edge layer, whereafter the pies are baked for 20 minutes at 220°–230° C.

The three products all have an attractive and good structure. The edge height of the product varies depending on the ascorbic acid content. At 0 mg ascorbic acid a product is obtained having a height of 31 mm. At 25 mg ascorbic acid a product is obtained having a height of 43 mm; at 50 mg ascorbic acid the height of the product is 46 mm.

From this it appears that adding ascorbic acid to the starting dough results in a good, light crusty pie.

I claim:

1. A method for preparing wholemeal puff pastry having an aerated structure which comprises:
   forming a dough comprising water and a flour from which bran has been removed;
   combining a vegetable fibre material that contains bran having an average particle size of 0.3 to 6 mm and fat in a weight ratio from 1:1 to 20:1 so as to form an intimately blended fat/fibre composition; and
   forming a puff pastry by rolling and folding said dough while adding the fat/fibre composition to form fat/fibre composition layers which separate the dough layers, more than half of the fibrous materials in the pastry being present at the interfaces in the fat/fibre composition and dough layers.

2. The method according to claim 1, wherein the vegetable fibre material comprises wheat bran.

3. The method according to claim 2, wherein the amount of wheat bran is selected such that the ratio wheat bran:flour in the puff pastry is equal to the ratio wheat bran:flour in a wholemeal wheat flour.

4. The method according to claim 1, wherein the puff pastry further comprises an additive selected from the group consisting of 10–500 mg per kg flour of ascorbic acid, 10–500 mg per kg flour of an edible oxidizing agent and mixtures thereof.

5. The method according to claim 1, wherein up to 10% by weight of a protein is incorporated in the puff pastry.

6. The method according to claim 1, wherein the flour has a protein content of at least 12% by weight calculated on the total weight of the flour, the fibre material and the fat.

7. A wholemeal puff pastry capable of forming an aerated structure on baking comprising a plurality of layers of dough separated by layers of a fat/fibre composition,
   the dough comprising water and a flour from which bran has been removed, and the fat/fibre composition comprising 2–20 parts by weight of fibre material that contains bran having an average particle size of 0.3 to 6 mm, the pastry having
   30–50 parts by weight of flour,
   15–25 parts by weight of water,
   2–20 parts by weight of fibre, and
   10–50 parts by weight of fat,
   the puff pastry being formed of layers of dough and of fat/fibre composition in which more than half of the fibre material in the pastry is present at interfaces of fat/fibre composition and dough layers.

8. The puff pastry according to claim 7, wherein the fibre material comprises sheet fibre particles oriented parallel to the layers of the puff pastry.

9. The puff pastry according to claim 7, further comprising an additive selected from the group consisting of 1–500 mg per kg flour of ascorbic acid, 10–500 mg per kg flour of an edible oxidizing agent and mixtures thereof.

10. The puff pastry according to claim 7, wherein the flour contains at least 12% protein by weight, calculated on the total weight of the flour, the fibre material and the fat.

* * * * *

UNITED STATES PATENT AND TRADEMARK OFFICE
CERTIFICATE OF CORRECTION

PATENT NO. : 5,080,915
DATED     : January 14, 1992
INVENTOR(S) : Henrik Frits Zock It is certified that error appears in the above-identified patent and that said Letters Patent is hereby corrected as shown below:

Title Page, Item 63, "Jun. 17, 1986" should read --June 17, 1987--;

Item 30, "Jun. 19, 1987" should read --June 19, 1986--;

Col. 1, line 9, "for puff" should read --for preparing puff--;

Col. 4, line 30, "as" should read --an--;

Col. 4, line 45, "220°-°C." should read --220°-230°C.--;

Col. 6, line 47, "1-500 mg" should read --10-500 mg--.

Signed and Sealed this

Eleventh Day of May, 1993

Attest:

MICHAEL K. KIRK

Attesting Officer

Acting Commissioner of Patents and Trademarks